United States Patent [19]

Matsumoto

[11] Patent Number: 4,880,074

[45] Date of Patent: Nov. 14, 1989

[54] STEERING SYSTEM FOR A MOTOR VEHICLE

[75] Inventor: Rempei Matsumoto, Ohta, Japan

[73] Assignee: Fuji Jukogyo Kabushiki Kaisha, Tokyo, Japan

[21] Appl. No.: 198,394

[22] Filed: May 24, 1988

[30] Foreign Application Priority Data

May 27, 1987 [JP] Japan ................................ 62-130643

[51] Int. Cl.⁴ .............................................. B62D 5/04
[52] U.S. Cl. ................................ 180/142; 74/388 PS; 180/148
[58] Field of Search ............... 180/141, 142, 148, 151, 180/152–157, 159–161, 163, 79.1, 79.3, 140; 74/388 PS, 498, 422

[56] References Cited

U.S. PATENT DOCUMENTS

| 867,282 | 10/1907 | MacFarren | 180/140 |
| 3,267,763 | 8/1966 | Merritt | 74/422 |
| 3,944,015 | 3/1976 | Bishop | 180/159 |
| 3,948,050 | 4/1976 | Kervagoret | 180/148 |
| 4,412,594 | 11/1983 | Furukawa | 180/142 |
| 4,708,220 | 11/1987 | Noto | 180/79.1 |

FOREIGN PATENT DOCUMENTS

| 59-16269 | 1/1984 | Japan. | |
| 160359 | 7/1986 | Japan | 180/79.1 |

Primary Examiner—Kenneth R. Rice
Assistant Examiner—Wook Yoon
Attorney, Agent, or Firm—Martin A. Farber

[57] ABSTRACT

A first rack-and-pinion device is operatively connected to a steering wheel of a motor vehicle, and a second rack-and-pinion device is provided to be operated by a motor. Both racks are operatively connected by a pair of link mechanisms. Each link mechanism is arranged to combine gear ratios of the first and second rack-and-pinion devices to steer front wheels of the vehicle at a resultant gearing ratio.

18 Claims, 2 Drawing Sheets

STEERING SYSTEM FOR A MOTOR VEHICLE

BACKGROUND OF THE INVENTION

The present invention relates to a steering system for a motor vehicle.

The steering system has a reduction gear train for transmitting the rotation of a steering wheel to front wheels of the vehicle. It is preferable to vary the gearing ratio in such a manner that it has a small value on either side of the straight-ahead position of the steering wheel and increases as the steering angle of the steering wheel increases. Such a steering system is called a variable ratio steering system and is disclosed various publications, for example U.S. Pat. No. 3,267,763 and Japanese Utility Model Laid Open No. 59-16269.

In the variable ratio steering system, the ratio can not be changed to other ratios than the set values. However, it is desirable for the ratio to be changed in accordance with driving conditions such as vehicle speed, side force exerted on the vehicle and other conditions.

SUMMARY OF THE INVENTION

The object of the present invention is to provide a steering system in which the gearing ratio can be changed in accordance with driving conditions.

The other objects and features of this invention will become understood from the following description with reference to the accompanying drawings.

BRIEF DESCRIPTION OF THE PREFERRED EMBODIMENT

FIG. 1 is a schematic diagram showing a steering system according to the present invention; and FIGS. 2a to 2e are illustrations showing operations of a part of the system.

DETAILED DESCRIPTION OF THE PREFERRED EMBODIMENT

Figure 1:
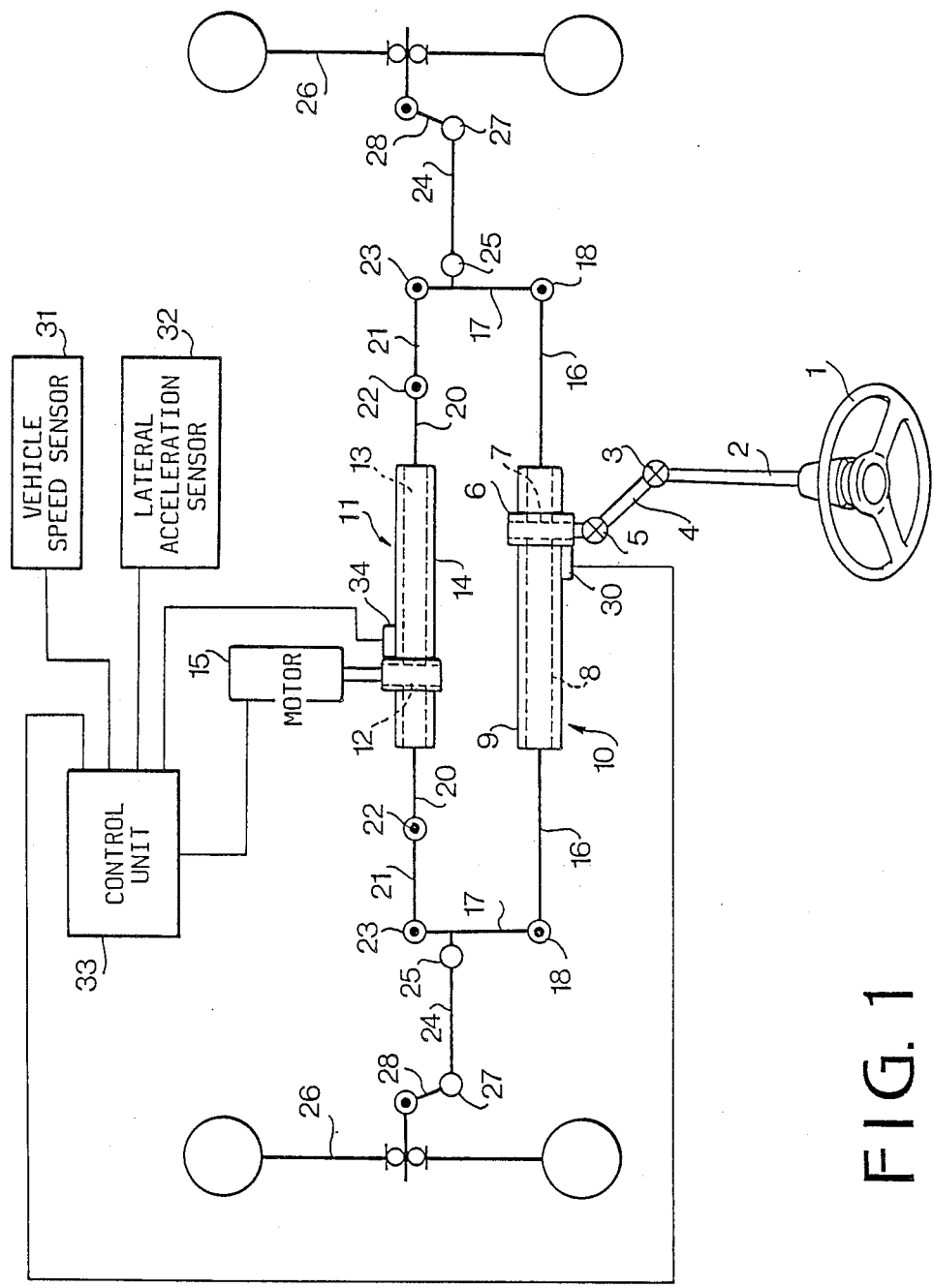

Referring to FIG. 1, a steering system comprises a steering wheel 1, steering shaft 2, joint 3, intermediate shaft 4, joint 5 and a first rack-and-pinion device 10. The first rack-and-pinion device has a gear box 6 having a pinion 7. The pinion 7 engages with a first rack 8 in a first rack housing 9. A second rack-and-pinion device 11 is provided in parallel with the first rack-and-pinion device 10. A pinion 12 of the device 11 is engaged with a second rack 13 in a second rack housing 14. The pinion 12 is operatively connected with an electric motor 15.

A pair of tie rods 16 connected to the first rack 8 at both ends thereof to form a first tie rod which is pivotally connected to connecting rods 17 by joints 18, respectively. Each tie rod 20 is connected second rack 13 to form a primary tie rod which is connected to the connecting rod 17 through an intermediate rod 21 and joints 22, 23. The primary tie rod and intermediate rods 21 form a second tie rod. A tie rod 24 is connected to the connecting rod 17 through a joint 25 at a position close to the end adjacent the joint 23. The tie rod 24 is operatively connected to a front wheel 26 of a vehicle through a joint 27 and a knuckle arm 28.

The system is provided with a steering angle sensor 30, vehicle speed sensor 31 and lateral acceleration sensor 32.

The outputs of these sensors are supplied to a control unit 33 for controlling the motor 15. The operation of the motor 15 is controlled by an output signal of the control unit 33 and by a feedback signal from an angular position sensor 34 for detecting an angular output of the motor 15. The control unit 33 is arranged to produce a control signal for operating the motor 15 in accordance with the vehicle speed signal fed from the vehicle speed sensor 31. When the vehicle speed is low, the motor operates to move the second rack 13 at a speed approximately equal to the speed of the first rack 8. As the vehicle speed increases, the speed of the second rack 13 is decreased compared with the speed of the first rack 8. In other words, the ratio of the speed of the second rack to the speed of the first rack is one at a low vehicle speed and approaches zero at a high vehicle speed.

Figure 2A:
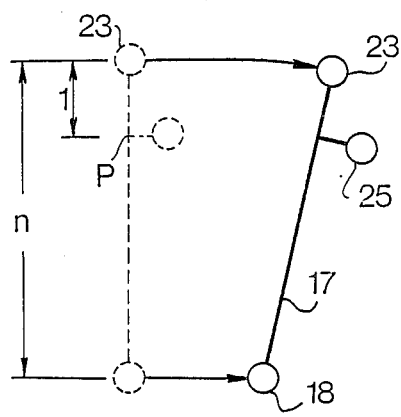
Figure 2B:
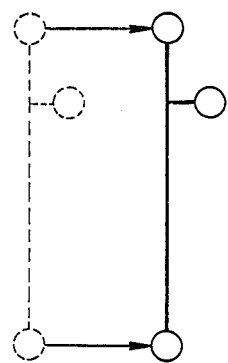

If, in a low vehicle speed range lower than 30 Km/h, the ratio of the speed of the second rack to the first rack is set to one, the second rack 13 is moved by the same distance as the first rack 8 as shown in FIG. 2b. Accordingly, the gearing ratio at that case is the same as the ratio (i) of the first rack and pinion device 11.

Figure 2C:
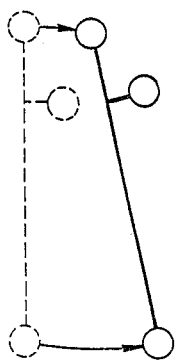
Figure 2D:
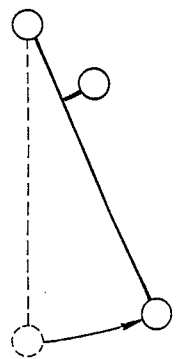

At a high vehicle speed, for example 100 Km/h, the speed ratio is set to zero, the second rack 13 is not moved as shown in FIG. 2d.

Assuming the length between the connecting portion P on the connecting rod 17 for the tie rod 24 is 1 and the length of the connecting rod 17 is n (FIG. 2a), the ratio of the displacement of the tie rod 24 to the displacement of the first rack 8 is 1/n. Thus, the resultant gearing ratio of the steering system becomes 1/n .i.

At an intermediate speed, for example 60 Km/h, the speed ratio of the second rack is set to a middle value, for example 0.5 as shown in FIG. 2c. The resultant gearing ratio in that case is 0.5 (1+i/n) which is an intermediate value between the ratio i and 1/n .i.

In an extreme low speed range, for example below 3 Km/h, the speed ratio of the second rack is set to a value larger than 1 as shown in FIG. 2a. Accordingly, the resultant gearing ratio becomes larger than the ratio i.

Figure 2E:
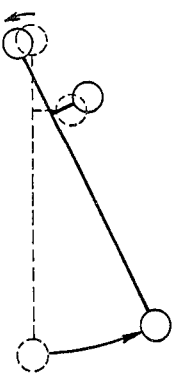

In an extreme high speed range, for example above 120 Km/h, the speed ratio of the second rack is set to a negative value close to zero as shown in FIG. 2e. The resultant gearing ratio becomes smaller than the ratio 1/n .i.

It is preferable that when a vehicle having an understeer characteristic is accelerated during cornering, the steering angle is increased. To meet such a requirement, when the output signal of the vehicle speed sensor 31 increases while the lateral acceleration sensor 32 produces an output which means cornering of the vehicle, the motor 15 is operated to move the second rack 13 to increase the steerig angle.

When the vehicle is subjected to a side force by a side wind during driving, the vehicle may become staggered. In such a case, the lateral acceleration sensor produces an output signal because of the staggering. In response to the output signal, the motor 15 is operated to shift the second rack 13 to correct the steering direction.

It will be understood that the gearing ratio can be controlled in accordance with the output signal of the steering angle sensor 30 in the same manner as the variable ratio steering system.

Although the motor 15 is provided for shifting the second rack 13, other actuators such as a hydraulic cylinder can be used.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A steering system for a motor vehicle comprising:
   a first gear device operatively connected to a steering wheel of the motor vehicle;
   a first tie rod operatively connected to the first gear device and arranged to be laterally displaced by the first gear device;
   a second gear device;
   a second tie rod operatively connected to the second gear device and arranged to be laterally displaced by the second gear device;
   actuating means for actuating the second gear device;
   at least one sensor for sensing at least one driving condition of the motor vehicle for producing an output signal;
   control means responsive to said output signal of the sensor for operating the actuating means;
   a pair of connecting rods operatively connecting both ends of the first and second tie rods at each end of the connecting rods, respectively; and
   a pair of link mechanisms operatively connected at a side of said connecting rods to front wheels of the motor vehicle so as to combine separate displacements of the first and second tie rods to steer the front wheels at a resultant gearing ratio.

2. The steering system according to claim 1 wherein each of the first and second gear devices is a rack-and-pinion device, and each of the first and second tie rods comprises a pair of tie rods connected to both ends of the rack.

3. The steering system according to claim 2 wherein the actuating means is an electric motor.

4. The steering system according to claim 2 wherein the sensor is a vehicle speed sensor.

5. The steering system according to claim 4 wherein said control means is arranged to reduce the resultant gearing ratio as the vehicle speed increases.

6. The steering system according to claim 1, wherein said driving condition is vehicle speed,
   said control means increases the resultant gearing ratio larger than the gear ratio of the first gear device when the vehicle speed is very low.

7. The steering system according to claim 1, wherein said driving condition is vehicle speed,
   said control means maintains the resultant gearing ratio at a constant value when the vehicle speed is low.

8. The steering system according to claim 7, wherein said constant value is the same as gear ratio of the first gear device.

9. The steering system according to claim 8, wherein
   said control means reduces the resultant gearing ratio lower than said constant value when the vehicle speed is high.

10. The steering system according to claim 7, wherein said control means reduces the resultant gearing ratio lower than said constant value when the vehicle speed is high.

11. The steering system according to claim 10, wherein
    said control means reduces the resultant gearing ratio more as the vehicle speed increases.

12. The steering system according to claim 1, wherein said driving condition is vehicle speed,
    said control means sets speed ratio of the second gear device to a negative value when the vehicle speed is extremely high.

13. The steering system according to claim 12, wherein said negative value is close to zero.

14. The steering system according to claim 1, wherein said driving condition is lateral acceleration representing vehicle staggering,
    said control means responsive to said output signals operatively shifts said second gear device so as to correct steering direction.

15. The steering system according to claim 1, wherein said at least one driving condition is lateral acceleration and vehicle speed,
    said control means responsive to said output signal operatively shifts said second gear device so as to increase steering angle of the front wheels when vehicle speed increases during lateral acceleration of the vehicle representing cornering of the vehicle.

16. The steering system according to claim 1, wherein said first and second tie rods are substantially parallel to each other and with said connecting rods form a parallelogram.

17. The steering system according to claim 16, wherein
    each said link mechanisms are connected to said connecting rods adjacent to those ends of said connecting rods which are operatively connected to said ends of said second tie rod.

18. The steering system according to claim 1, wherein said second tie rod comprises a primary rod and intermediate rods pivotally connected between corresponding ends of said connecting rods and ends of said primary rod.

* * * * *